United States Patent [19]

Göldner

[11] 4,191,423

[45] Mar. 4, 1980

[54] HEADREST FOR VEHICLES

[75] Inventor: Walther Göldner, Ebersbach, Fed. Rep. of Germany

[73] Assignee: Recaro GmbH & Co., Kirchheim, Fed. Rep. of Germany

[21] Appl. No.: 969,959

[22] Filed: Dec. 15, 1978

[30] Foreign Application Priority Data

Dec. 29, 1977 [DE] Fed. Rep. of Germany ... 7739993[U]

[51] Int. Cl.$^2$ .............................................. A47C 7/38
[52] U.S. Cl. .................................. 297/408; 297/410
[58] Field of Search ................... 297/408, 410, 391

[56] References Cited

U.S. PATENT DOCUMENTS

| 1,009,417 | 11/1911 | John ................... 297/408 X |
| 2,828,810 | 4/1958 | Barecki ................ 297/408 X |
| 3,650,561 | 3/1972 | Faust et al. ............ 297/391 |
| 4,099,779 | 7/1978 | Goldner ................ 297/408 |

FOREIGN PATENT DOCUMENTS

| 2405774 | 8/1975 | Fed. Rep. of Germany ........ 297/391 |
| 2647725 | 4/1978 | Fed. Rep. of Germany ........ 297/408 |
| 2305314 | 10/1976 | France ........................... 297/391 |

Primary Examiner—Francis K. Zugel
Attorney, Agent, or Firm—Wigman & Cohen

[57] ABSTRACT

A headrest for vehicles, especially motor vehicles, is disclosed which comprises a hollow upholstery support mounted for limited pivotal movement on a holder comprising two shanks secured to a vehicle backrest. Stop elements for limiting the pivotal movement are provided for each shank of the holder and abut against the front wall of the support on opposite sides of the pivotal axis of the support. The upholstery support in one embodiment comprises a pair of shells or front and rear support elements made of plastic and having different strength characteristics. The front support element is designed to absorb the forces of the stop elements and the rear support element is designed to be deformable to provide improved safety for passengers seated behind the headrest.

8 Claims, 6 Drawing Figures

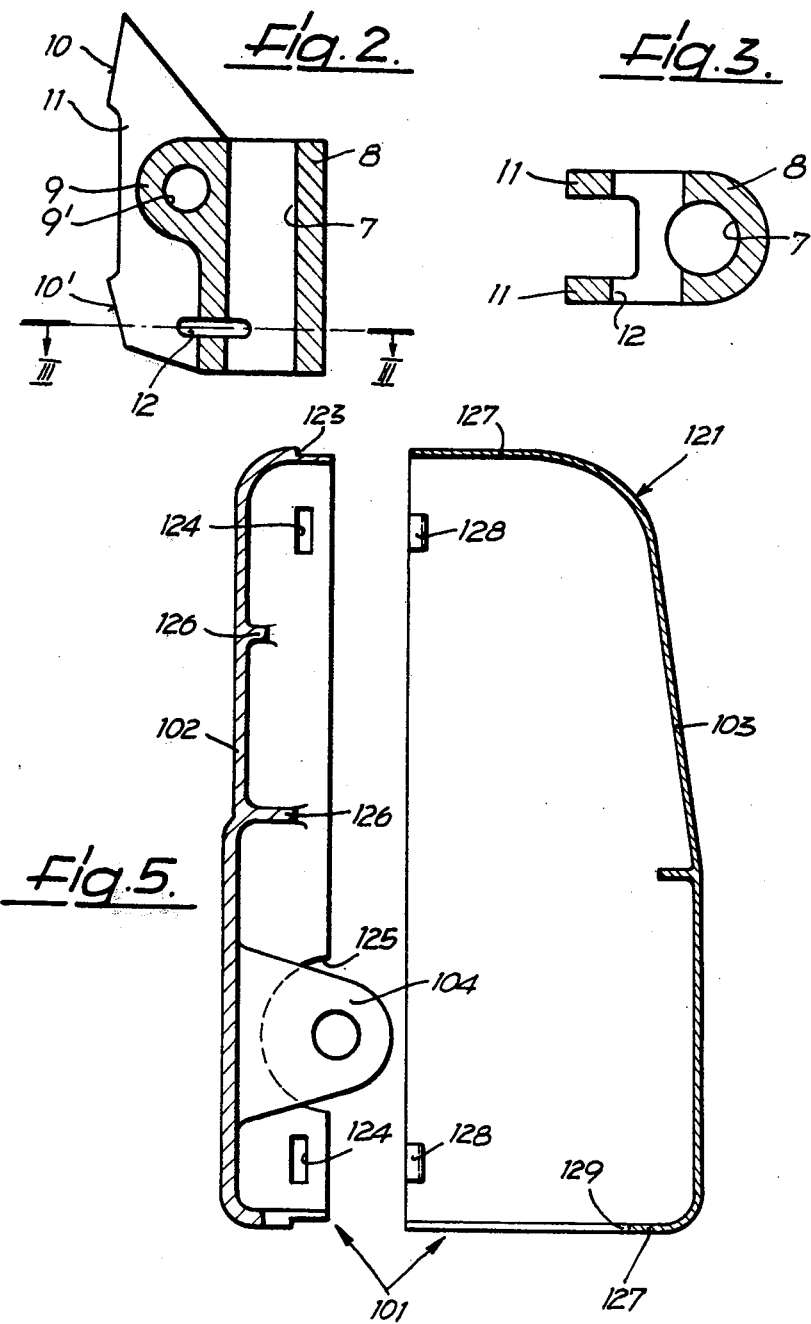

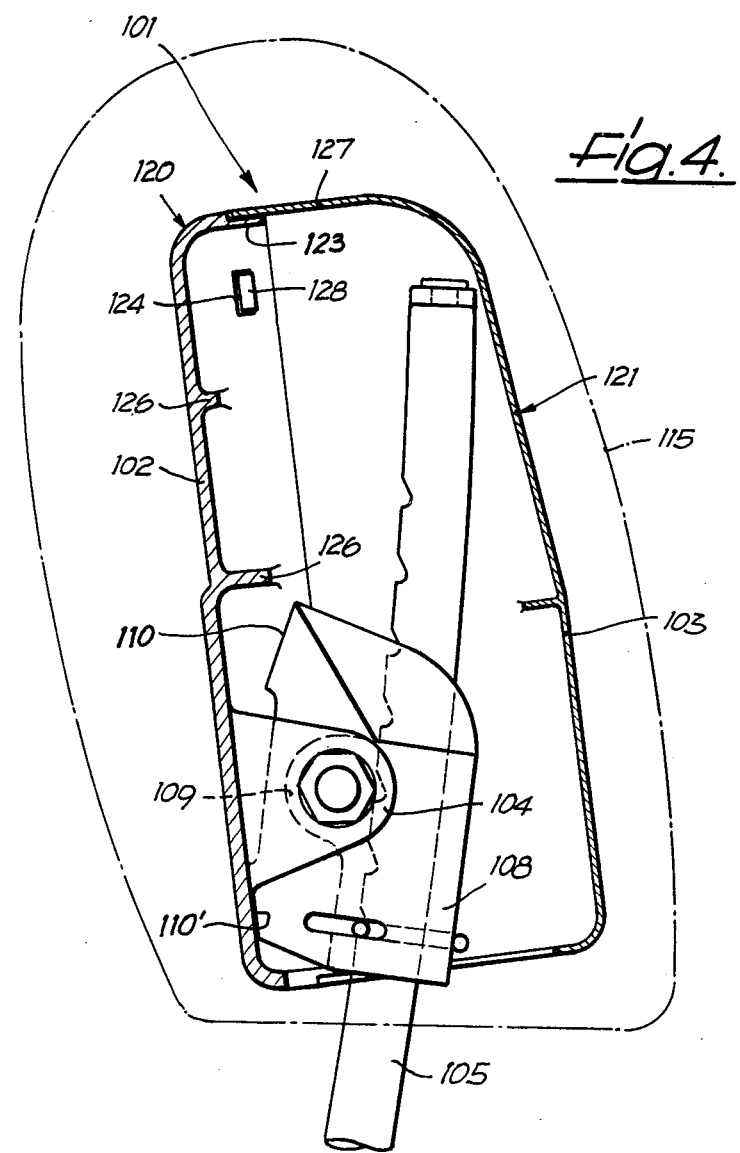

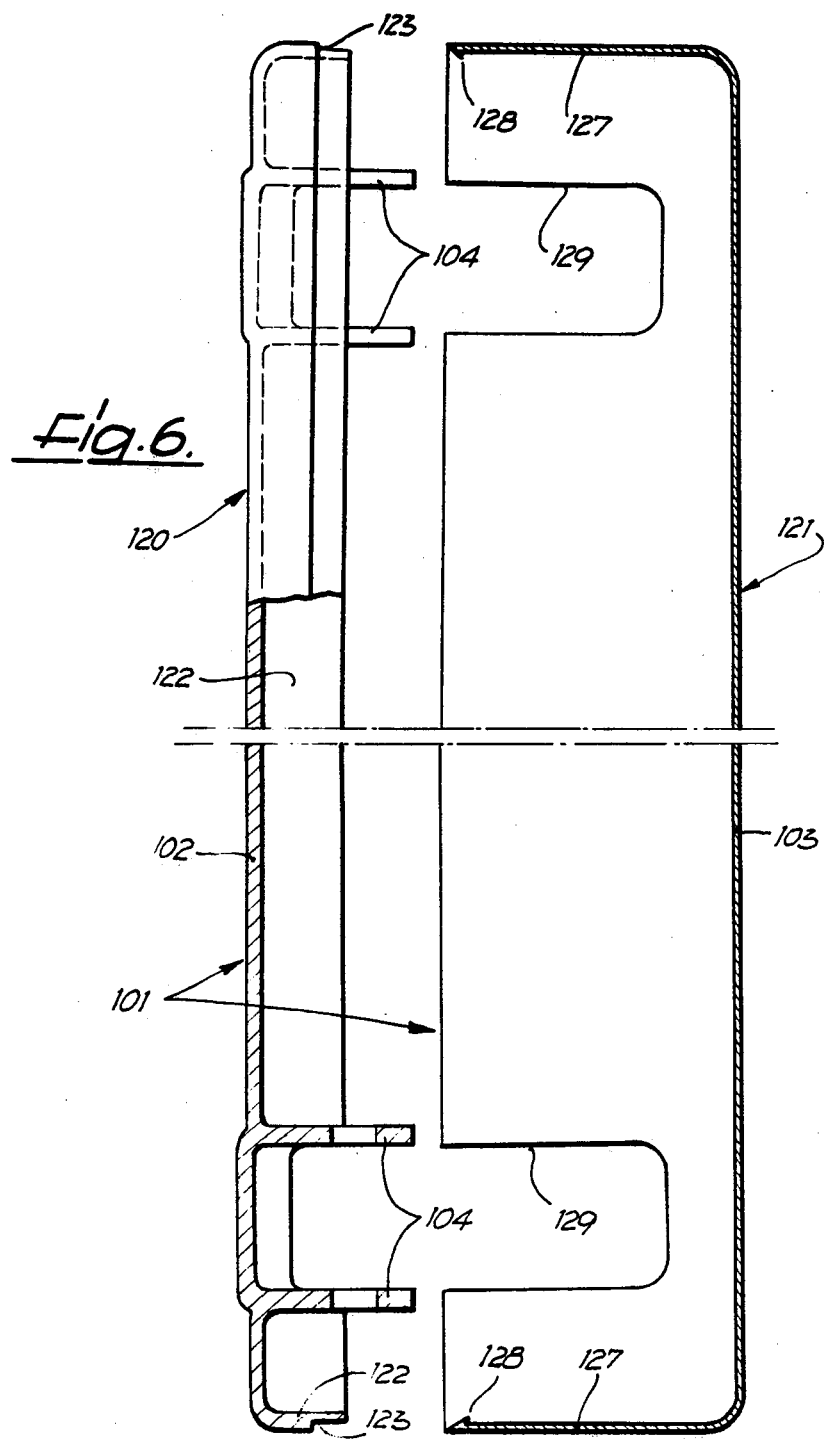

HEADREST FOR VEHICLES

BACKGROUND OF THE INVENTION

The present invention relates to a headrest for vehicles, especially motor vehicles, having a hollow upholstery support, a bow-shaped holder mounted in the area of its two shanks in a frictional manner between cheeks so as to be pivotable or rotatable and having a stop element for each shank of the holder. The stop elements bear against the forward wall of the upholstery support at each end of the range of rotation of the upholstery support.

In the known headrest of this general type, the stop elements abut the front and back walls respectively of the upholstery element at each end of the range of rotation of the support. The upholstery element must,, therefore, be formed both in the area of its front wall and its back wall in such a manner that even high loads or forces, such as may occur in an accident, can be absorbed by the upholstery element and that the rigidity caused by the stop element cannot result in injury.

SUMMARY AND OBJECTS OF THE INVENTION

A primary objective of the invention, therefore, is to provide a headrest in which the presence of stop elements is not detrimental or dangerous to passengers, despite the simplest possible embodiment of the upholstery support.

Because the connecting body which forms the stop elements can only come into contact with one wall of the upholstery support, only this wall need be constructed to take high loads. The other wall, in contrast, can be constructed in such a manner that the greatest possible safety from injury is provided in an accident, which can be obtained, for example, by a sufficient deformability of such other wall. A relatively rigid embodiment of the front wall is not undesirable for headrests for the front vehicle seats, because headrests are provided with a thick layer of upholstery on the front side. In contrast, it is usual to provide an upholstery layer on the back wall of the headrest with a substantially smaller thickness while in a headrest for the rear vehicle seats, a rigid embodiment of the back wall is not undesirable. A further substantial advantage is that because of the different loads placed on the front wall and the back wall of the upholstery element, said element can comprise two portions. This is advantageous both for manufacture from either metal or plastic. Particularly with a plastic model, the two-piece embodiment of the two elements advantageously makes possible an economical manufacture.

Preferably, the connecting bodies are also formed of plastic. For manufacturing reasons, it is then advantageous to provide the stop surfaces or elements on two ribs which project toward the front wall of the upholstery support.

The connecting bodies offer, in an especially simple manner, the possibility of adjustably mounting the shanks of the holder therein so as to be longitudinally shiftable as well as to be selectably positionable. The necessary height adjustment of the headrest can then take place in the area of the upper end of the shank, so that the lower shank can be nonadjustably or fixedly connected with the back rest of the associated seat. This is especially advantageous with regard to protecting against injury from the impact of a person on the rear side of the backrest.

In order to keep the expense for the upholstery support as low as possible, as well as that of the holder, in one preferred exemplary embodiment the upper ends of the two shanks are connected with a flat bar which extends from one shank to the other.

The cheeks for mounting the connecting bodies can, if the upholstery support is formed of sheet metal, be welded thereto or be formed by tongues, which are cut out of the upholstery element and then bent outwardly. If the upholstery support is made of plastic, it is then advantageous to form the cheeks on the portion of the upholstery element which forms the front wall.

BRIEF DESCRIPTION OF THE DRAWINGS

The invention is described below in greater detail with the aid of two exemplary embodiments illustrated in the drawings, wherein:

FIG. 2 is an enlarged cross-sectional view through one of the connecting bodies;

FIG. 3 is a cross-sectional view taken along the line III—III of FIG. 2;

FIG. 4 is a cross-sectional view through a second exemplary embodiment of the invention;

FIG. 5 is an exploded cross-sectional view through the upholstery spport of the second exemplary embodiment; and FIG. 6 is a cross-sectional view in a plane parallel to the underside of the upholstery support of the second exemplary embodiment.

DETAILED DESCRIPTION OF A PREFERRED EMBODIMENT

Figure 1:
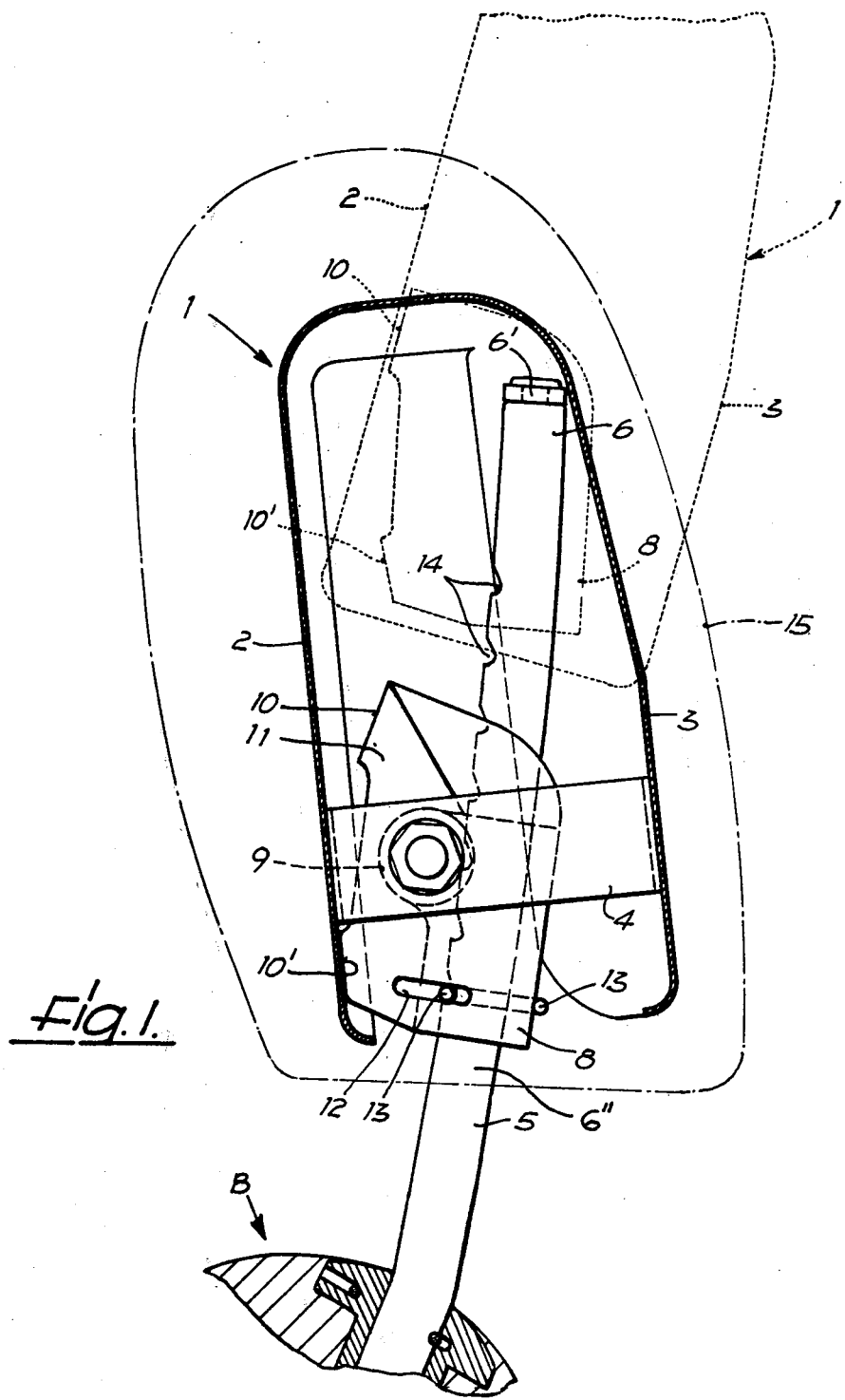
FIG. 1 is a cross-sectional view of a first exemplary embodiment of the invention illustrating two different positions of the headrest.

The motor vehicle headrest shown in FIG. 1 comprises an upholstery support 1 made of sheet metal and having a U-shaped cross-sectional profile. The side edges of the front wall 2 and the back wall 3 are bent toward each other to form a rounded area, without completely closing off the upholstery support at the sides and from beneath. In the interior of the upholstery support 1, namely, in the lower half bordered by the parallel sections of the front wall 2 and the back wall 3, two identical pairs of mounting cheeks 4 are symmetrically arranged with regard to the lateral center plane. Each pair of cheeks, in the exemplary embodiment, is formed by a rectangular frame formed by bending sheet metal, the two narrow sides of which lie against the front wall 2 and back wall 3 and are spot welded thereto. The mounting cheeks 4 are provided with a bore, which, as shown in FIG. 1, lies closer to the front wall 2 than to the back wall 3. The bores are aligned with each other and their longitudinal axes lie parallel to the upper side and the lower side of the upholstery support 1 and in a plane parallel to the longitudinal center plane.

The upholstery support 1 is height-adjustable and is pivotably connected with two identical round support rods 5, which are rigidly connected with each other by means of a flat bar 6' at their upper ends 6, which ends enter into the interior of the upholstery support 1. The height-adjustable connection of the two support bars 5 with the frame of the associated back rest is formed in this exemplary embodiment in a manner such that two sleeves are provided which are rigidly connected with the upper cross bar of the back rest frame, and which receive the lower end sections 6 of each of the two support bars 5. The lower end section 6" is provided with a detent groove 14, which is entered by a catch spring 13, guided in a slit 12 in the sleeve. Thus, the support bars 5 and the connecting flat bar 6' form a holder for pivotably mounting the upholstery support in a frictional manner while the lower end sections 6" of the support bars 5 are mounted in a backrest B.

The upper end section of each support bar 5 is guided in a guide bore 7 of a one piece, plastic connecting body 8 so as to be longitudinally movable. The portion of the connecting body 8 containing the guide bore 7 is formed in the manner of a sleeve. A hub 9 is formed on the upper end of this portion. The longitudinal axes of bores 9' in the hubs 9 extend at right angles to the longitudinal axis of the guide bore 7. Furthermore, as shown in FIG. 1, the bore 9' is radially displaced with respect to the longitudinal axis of the guide bore 7 to such an extent that the upper end section 6 of the guide rod 5 can pass the hub 9. By means of a bolt which passes through both the hub bore 9' and the associated mounting cheeks and a nut, the two mounting cheeks are pressed against one or the other of the frontal surfaces of the hub 9 to achieve the necessary friction. Two parallel ribs 11 are formed on the portion of the connecting body 8 which forms the guide bore 7 and on the hub 9 there are formed two parallel ribs 11, which lie in planes parallel to the longitudinal axis of the guide bore 7 and into which the two end sections of the hub 9 merge. The longitudinal axes of the hubs 9 extend at right angles to these ribs. The ribs 11 extend upward beyond the guide bore 7 and are provided on their narrow sides facing the front wall 2 of the upholstery support 1 with two stop surfaces 10 and 10'. The stop surface 10 lies above, the stop surface 10' below the hub 9, and are inclined with respect to the longitudinal axis of the guide bore 7 in such a manner that the full stop surface 10 lies against the inside of the front wall 2 when the upholstery support 1 is in its rear end position, and the full stop surface 10' lies against the inside of the front wall 2 of the upholstery support when said upholstery support is in its front end position. The stop surface 10 thus defines the limit of clockwise rotation of the upholstery support 1 as seen in FIG. 1, and the stop surface 10' defines the limit of counterclockwise rotation, as viewed in the same direction, by abutment against the front wall 2.

Below the hub 9, the connecting body is provided with a slit 12 which extends into the guide bore 7. One end of a thin, hairpin-like catch spring 13 engages this slit 12, and the other end lies against the back side of the connecting body. The front end sections of the support bars which extend into the upholstery support 1 are provided with detent grooves 14 which are spaced from each other along the longitudinal direction of the rod. The end of the catch spring 13 which engages the slit 12 can engage grooves 14 to hold the headrest at the desired height.

An upholstery element 15 is placed on the upholstery support 1, which covers the upholstery support on all sides. The thickness of the upholstery element 15 is substantially greater on the front side than on the back side. The stiffening of the front wall 2 by the stop surfaces 10 and 10' in one of the two end positions of the upholstery support 1 does not, therefore, inhibit safety when there is impact between the head and the front wall.

The second exemplary embodiment shown in FIGS. 4–6 is distinguished from the first exemplary embodiment only by a different upholstery support 101. With regard to the shape of the support bars 105, the connecting bodies 108 and the upholstery body 115, reference is made to the explanations of the corresponding structural elements together with the first exemplary embodiment.

The upholstery support 101 is divided in a plane which lies parallel to its axis of rotation. The front portion including the front wall 102 is designated in its entirety with the numeral 120, and the portion including the back wall 103 is designated in its entirety with numeral 121.

The front portion 120 has the shape of a shell with a raised, surrounding side wall 122. The latter forms, as shown especially in FIG. 5, a step 123 on its outer side at a distance from its free edge, which is attained in the exemplary embodiment by a decreased wall thickness in the area between the step and the free edge. In the wall portions bordering the sides of the upholstery support, this area of decreased wall thickness has two depressions or openings 124 which border on the step. In addition, these wall portions are each provided with cutouts 125 which extend toward the floor from the free edge. are shaped as half circles in the exemplary embodiment, and which are aligned with the mounting cheeks 104 formed in the lower half of the front portion 120 of the inside of the front wall 102 forming the floor of the shell. These mounting cheeks 104 are formed by two pair of integral ribs, the distance from each other being matched to the axial length of the hub 109 of the associated connecting body 108. The center of the mounting bore of the mounting cheeks lies at about the same height as the free edge of the side wall 122. Above the mounting cheeks 104, stiffening ribs 126 which run parallel to the axis of rotation are formed on the inside of the front wall 102.

The back portion 121 of the upholstery support 101 is also formed as a shell with a raised side edge 127. As shown in FIG. 5, this back portion 121 is distinguished from the front portion 120 by substantially thinner wall thickness and a substantially greater height of the raised side edge 127. The wall thickness is the same as the height of the step 123, which comes into contact with the free raised side edge 127 of the back portion 121 which overlaps the edge zone of decreased wall thickness of the front portion 120. On the inside of the side edge 127, integral, hook-like projections 128 are directed toward the opening 124 and snap into same when the two portions 120 and 121 of the upholstery support 101 are put together.

As shown in FIG. 6, in the section which forms the underside of the upholstery support, the side edge 127 of the back portion 121 is provided with two cutouts 129 which penetrate from the free edge toward the floor of the shell which forms the back wall 103. These cutouts 129 are directed toward the support bars 105 and provide sufficient free space therefor which they require for a pivoting of the upholstery support 101 from one end position into the other. Otherwise, the upholstery support 101 is completely closed on its underside. It is also completely closed at the sides with the exception of openings formed by the cutouts 125. This increases the protection against injury from impact on the headrest. The shape of the rear portion 121 of the upholstery support, however, also adds to an increased protection against injury from impact against the headrest. Because the stop surfaces of the connecting bodies 108 abut only on the front wall 102, the back wall 103 may be located a relatively great distance from small wall thickness. The rear portion 121 of the upholstery support 101 therefore has relatively great flexibility, by means of which, when there is an impact, the shock is substantially better dampened than with a relatively rigid embodiment of the back wall. The upholstery support 101 need only be covered by a relatively thick layer of upholstery in the area of the front wall 102, and not in the area of the back wall 103.

If the two portions 120 and 121 of the upholstery support were to be connected with each other by a thin plastic hinge, which for example could be provided on the upper side of the upholstery support, then in other respects the two portions could be formed as described above.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. In a headrest for vehicles, especially motor vehicles, including an upholstery support having front and back walls, holder means for pivotably mounting in a frictional manner the upholstery support, and stop means for limiting the pivotal range of movement of the upholstery support, the improvement wherein said stop means comprises:

at least one connecting body mounted to the holder means and pivotably mounted to the upholstery support, said connecting body defining the axis of rotation of the upholstery support, said connecting body having at least two stop surfaces arranged on opposite sides of the axis of rotation of the upholstery support so as to abut the front wall of the upholstery support and to limit the clockwise and counterclockwise pivotal range of movement of the upholstery support;

said upholstery support being formed of two support portions joined along a plane through the axis of rotation of the upholstery support;

one of the two support portions including the front wall of the upholstery support and the other of the two support portions including the back wall of the upholstery support; and said front wall being thicker than said back wall, so as to enable raised side edges of the back wall to fit over stepped side edges of the front wall and to enable the back wall to be more flexible to thereby better dampen the shock of an impact.

2. The improvement according to claim 1, wherein said stop surfaces comprise two ribs of the connecting body which projects, toward the front wall of the upholstery support.

3. The improvement according to claim 1, wherein the connecting body is mounted for longitudinal movement along the holder means and including means for locking the connecting body in a selected longitudinal position along the holder means.

4. The improvement according to claim 1, wherein said holder means comprises a pair of support rods having upper and lower ends, the lower ends of the support rods being mounted in a backrest and the upper ends of the support rods being rigidly connected by a bar.

5. The improvement according to claim 1, wherein said two support portions of the upholstery support are formed of plastic.

6. The improvement according to claim 1, including cheeks, formed on the front wall of the upholstery support, for pivotably mounting the connecting body.

7. The improvement according to claim 1, wherein said two support portions of the upholstery support are joined together by a plurality of snap connectors.

8. The improvement according to claim 1, wherein the upholstery support is hollow.

* * * * *